United States Patent [19]

Lipp

[11] Patent Number: 5,476,202

[45] Date of Patent: Dec. 19, 1995

[54] AUTOMOBILE MOUNTED MULTIPLE BIKE AND SKI RACKS

[76] Inventor: Dale J. Lipp, P.O. Box 554, Nora Springs, Iowa 50458

[21] Appl. No.: 298,755

[22] Filed: Aug. 31, 1994

[51] Int. Cl.⁶ .............................. B60R 9/10; B60R 9/12
[52] U.S. Cl. .................... 224/532; 224/924; 224/519; 224/536; 224/570
[58] Field of Search .................. 224/42.03 B, 42.03 A, 224/917, 42.03 R, 42.07, 42.04, 42.21, 45.45 R, 42.38; 211/5, 17, 18, 22; 248/316.1

[56] References Cited

U.S. PATENT DOCUMENTS

| | | | |
|---|---|---|---|
| 594,627 | 11/1897 | Hewlett | 211/22 |
| 640,736 | 1/1900 | Biester | 211/18 |
| 3,794,227 | 2/1974 | Stearns | 224/42.03 B |
| 3,877,622 | 4/1975 | McLain | 211/17 |
| 4,116,341 | 9/1978 | Hebda | 224/42.03 B |
| 4,298,151 | 11/1981 | O'Conner | 211/22 |
| 4,887,754 | 12/1989 | Boyer et al. | 211/17 |
| 5,219,105 | 6/1993 | Kravitz | 224/42.03 B |
| 5,259,542 | 11/1993 | Newbold et al. | 224/42.03 B |
| 5,303,857 | 4/1994 | Hewson | 224/42.03 B |
| 5,330,084 | 7/1994 | Peters | 224/42.03 B |

FOREIGN PATENT DOCUMENTS

| | | | |
|---|---|---|---|
| 2077917 | 5/1993 | Canada | 224/42.03 B |

Primary Examiner—Henry J. Recla
Assistant Examiner—Gregory M. Vidovich

[57] ABSTRACT

An automobile mounted multiple bike and ski rack comprising a main support column formed as a generally rectangular shaped block and configured into an L-shaped orientation, the column having a vertically positioned member and a horizontally positioned member, the horizontal member extending rearwardly with respect to the long member, the free end of the horizontal member including coupling means and adapted to be positioned inside a tow hitch in the operative orientation; a cross bar formed as a generally rectangular shaped block and affixed in a horizontal orientation on top of the vertical member of the main support column; and two side bars each consisting of upper and lower mounting brackets, the mounting brackets being formed as generally rectangular shaped blocks with each including apertures positioned near each end, one end of each lower bracket being affixed to the cross bar, each upper bracket being positioned on top of the lower brackets, bolts with cooperatively coupled wing nuts being positioned through the apertures to permit retaining of objects between the mounting brackets, a plurality of bicycle frame brackets formed in a generally semi circular configuration, the bicycle frame brackets being affixed to at least one of the side bars to aid retainment of bicycles during transport.

3 Claims, 4 Drawing Sheets

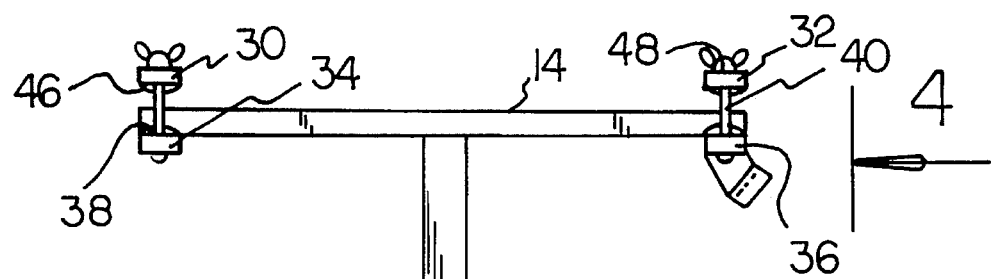
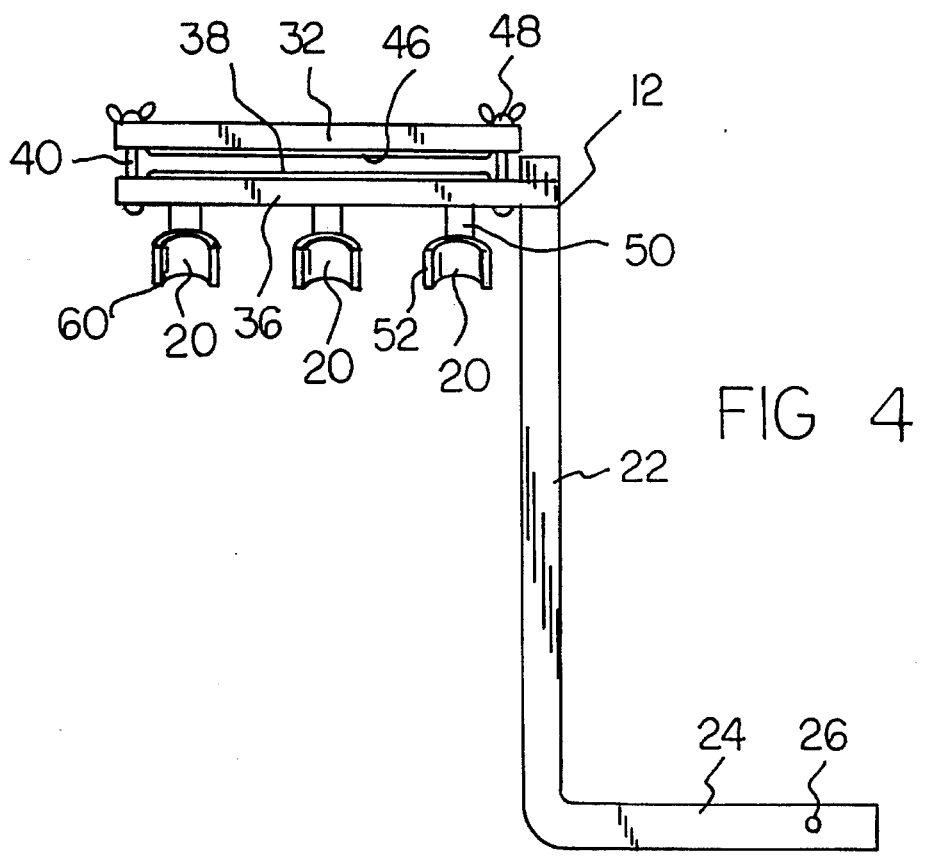

AUTOMOBILE MOUNTED MULTIPLE BIKE AND SKI RACKS

BACKGROUND OF THE INVENTION

1. Field of the Invention

The present invention relates to automobile mounted multiple bike and ski racks and more particularly pertains to securing three bicycles or three pairs of skis to the rear of a vehicle for transport.

2. Description of the Prior Art

The use of bicycle carrying devices is known in the prior art. More specifically, bicycle carrying devices heretofore devised and utilized for the purpose of affixing a bicycle to an automobile for transport are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,215,233 to Baldeck a bicycle carrier for vehicles.

U.S. Pat. No. 4,050,616 to Mosow discloses a bumper-style bicycle carrying apparatus.

U.S. Pat. No. 4,997,116 to Grim discloses a rear mountable carrier rack.

U.S. Pat. No. 4,863,080 to Graber discloses a bumper mounted bicycle carrier.

Lastly, U.S. Pat. No. 3,924,787 to Gothrup discloses a carrier bracket for attaching a bicycle relative to a motor vehicle's bumper.

In this respect, the automobile mounted multiple bike and ski racks according to the present invention substantially depart from the conventional concepts and designs of the prior art, and in doing so provide an apparatus primarily developed for the purpose of securing three bicycles or three pairs of skis to the rear of a vehicle for transport.

Therefore, it can be appreciated that there exists a continuing need for new and improved automobile mounted multiple bike and ski racks which can be used for securing three bicycles or three pairs of skis to the rear of a vehicle for transport. In this regard, the present invention substantially fulfills this need.

SUMMARY OF THE INVENTION

In view of the foregoing disadvantages inherent in the known types of bicycle carrying devices now present in the prior art, the present invention provides an improved automobile mounted multiple bike and ski rack. As such, the general purpose of the present invention, which will be described subsequently in greater detail, is to provide a new and improved automobile mounted multiple bike and ski rack and method which has all the advantages of the prior art and none of the disadvantages.

To attain this, the present invention essentially comprises a new and improved automobile mounted multiple bike and ski rack comprising, in combination: a main support column formed as generally a rectangular shaped block and configured into an L-shaped orientation, the column having a long vertically positioned member and a short horizontally positioned member, the two members having inboard ends cut at approximately forty five degree angles, the two inboard ends being welded together to form the L-shaped structure, the long member having a front face, a rear face, and two side faces, the short member extending rearwardly with respect to the long member and including an upper face, a lower face and two side faces, a lock pin hole extending through the side faces of the short member near its rearwardmost extent, the rearwardmost extent of the short member adapted to be positioned inside a standard one and one-quarter to two inch tow hitch, the lock pin hole receiving a coupling pin to securely couple the column within the hitch in the operative orientation; a cross bar formed as a generally rectangular shaped block and welded on top of the vertically positioned long member of the main support column at the approximate center point of the bar, the cross bar having an upper face and a lower face and positioned horizontally in the operative orientation; two side bars each consisting of upper and lower mounting brackets, a first and second lower bracket being formed as generally rectangular shaped blocks with an upper face, a lower face, an inboard end and an outboard end, each lower bracket including centrally positioned apertures near each end, the inboard end of the lower bracket being welded to the lower surface of the cross bar, the upper face of each lower bracket including a generally rectangular shaped rubber strip positioned between the apertures, bolts with a plurality of external screw threads being positioned in an inverted orientation through each aperture, the bolt heads being welded to the lower surface of the side bars, each upper bracket formed as a generally rectangular shaped block with an upper face, a lower face, an inboard end and an outboard end, each upper bracket including centrally positioned apertures near each end, the lower face of each upper bracket including a generally rectangular shaped rubber strip positioned between the apertures, the upper brackets being positioned on top of the lower brackets with the bolts positioned through the apertures, wing nuts cooperatively couple with the bolts to retain the upper brackets in place, the upper and lower brackets adapted to secure up to three pairs of skis and poles or up to three bicycles in the operative orientation; and three bicycle frame brackets being comprised of an inboard segment and an outboard segment, each inboard segment formed as a generally rectangular shaped block with two ends, a first end of each inboard segment being welded to the lower surface of the second side bar with each being equidistantly spaced between the apertures, the inboard segments being positioned in an angled orientation forming between about a thirty and sixty degree angle with respect to the horizontally positioned side bar, each outboard segment being formed in a generally planar semi circular shaped configuration, each outboard segment being welded to the second end of each inboard segment, the concave surface of each outboard segment including foam rubber padding affixed thereto, the bicycle frame brackets adapted to aid in the support of bicycles secured within the brackets of the apparatus.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved automobile mounted multiple bike and ski racks which have all the advantages of the prior art bicycle carrying devices and none of the disadvantages.

It is another object of the present invention to provide new and improved automobile mounted multiple bike and ski racks which may be easily and efficiently manufactured and marketed.

It is further object of the present invention to provide new and improved automobile mounted multiple bike and ski racks which are of durable and reliable constructions.

An even further object of the present invention is to provide new and improved automobile mounted multiple bike and ski racks which are susceptible of a low cost of manufacture with regard to both materials and labor, and which accordingly are then susceptible of low prices of sale to the consuming public, thereby making such automobile mounted multiple bike and ski racks economically available to the buying public.

Still yet another object of the present invention is to provide new and improved automobile mounted multiple bike and ski racks which provide in the apparatuses and methods of the prior art some of the advantages thereof, while simultaneously overcoming some of the disadvantages normally associated therewith.

Still another object of the present invention is to secure three bicycles or three pairs of skis to the rear of a vehicle for transport.

Lastly, it is an object of the present invention to provide new and improved automobile mounted multiple bike and ski racks comprising a main support column formed as a generally rectangular shaped block and configured into an L-shaped orientation, the column having a vertically positioned member and a horizontally positioned member, the horizontal member extending rearwardly with respect to the long member, the free end of the horizontal member including coupling means and adapted to be positioned inside a tow hitch in the operative orientation; a cross bar formed as a generally rectangular shaped block and affixed in a horizontal orientation on top of the vertical member of the main support column; and two side bars each consisting of upper and lower mounting brackets, the upper and lower brackets being formed as generally rectangular shaped blocks with each including apertures positioned near each end, one end of each lower bracket being affixed to the cross bar, each upper bracket being positioned on top of the lower brackets, bolts with cooperatively coupled wing nuts being positioned through the apertures to permit retaining of objects between the upper and lower brackets, a plurality of bike clamps formed in a generally semi circular configuration, the bicycle frame brackets being affixed to at least one of the side bars to aid retainment of bicycles during transport.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear perspective view of the automobile mounted multiple bike and ski rack.

FIG. 4 is a side perspective view of the automobile mounted multiple bike and ski rack.

The same reference numerals refer to the same parts through the various Figures.

DESCRIPTION OF THE PREFERRED EMBODIMENT

Figure 1:
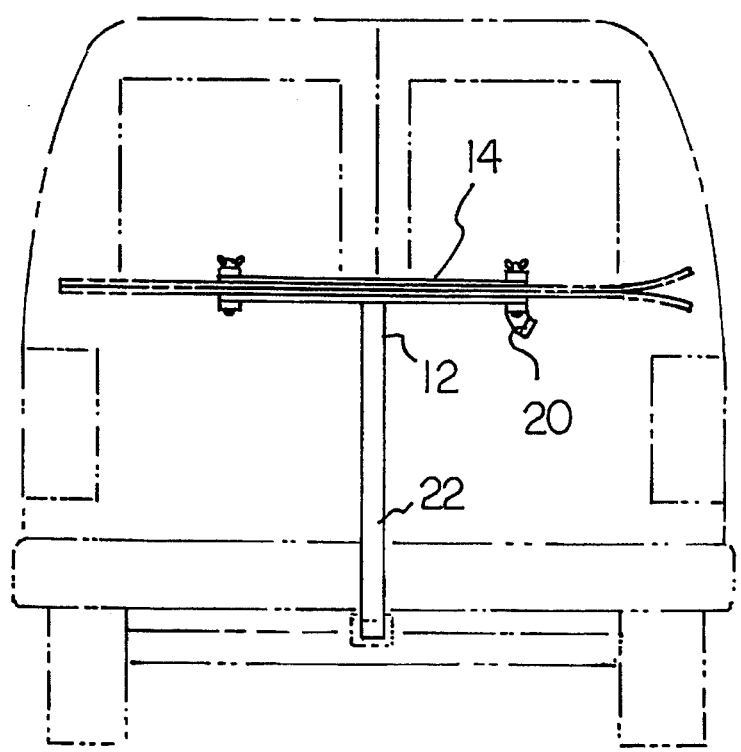
FIG. 1 is a perspective view of the preferred embodiment of the automobile mounted multiple bike and ski rack constructed in accordance with the principles of the present invention.

With reference now to the drawings, and in particular to FIG. 1 thereof, the preferred embodiment of the new and improved automobile mounted multiple bike and ski racks embodying the principles and concepts of the present invention and generally designated by the reference numeral 10 will be described.

The present invention, the new and improved automobile mounted multiple bike and ski rack is comprised of a plurality of components. Such components in their broadest context include a main support column 12, a cross bar 14, two side bars 16, 18 and three bicycle bicycle frame brackets 20.

Figure 7:
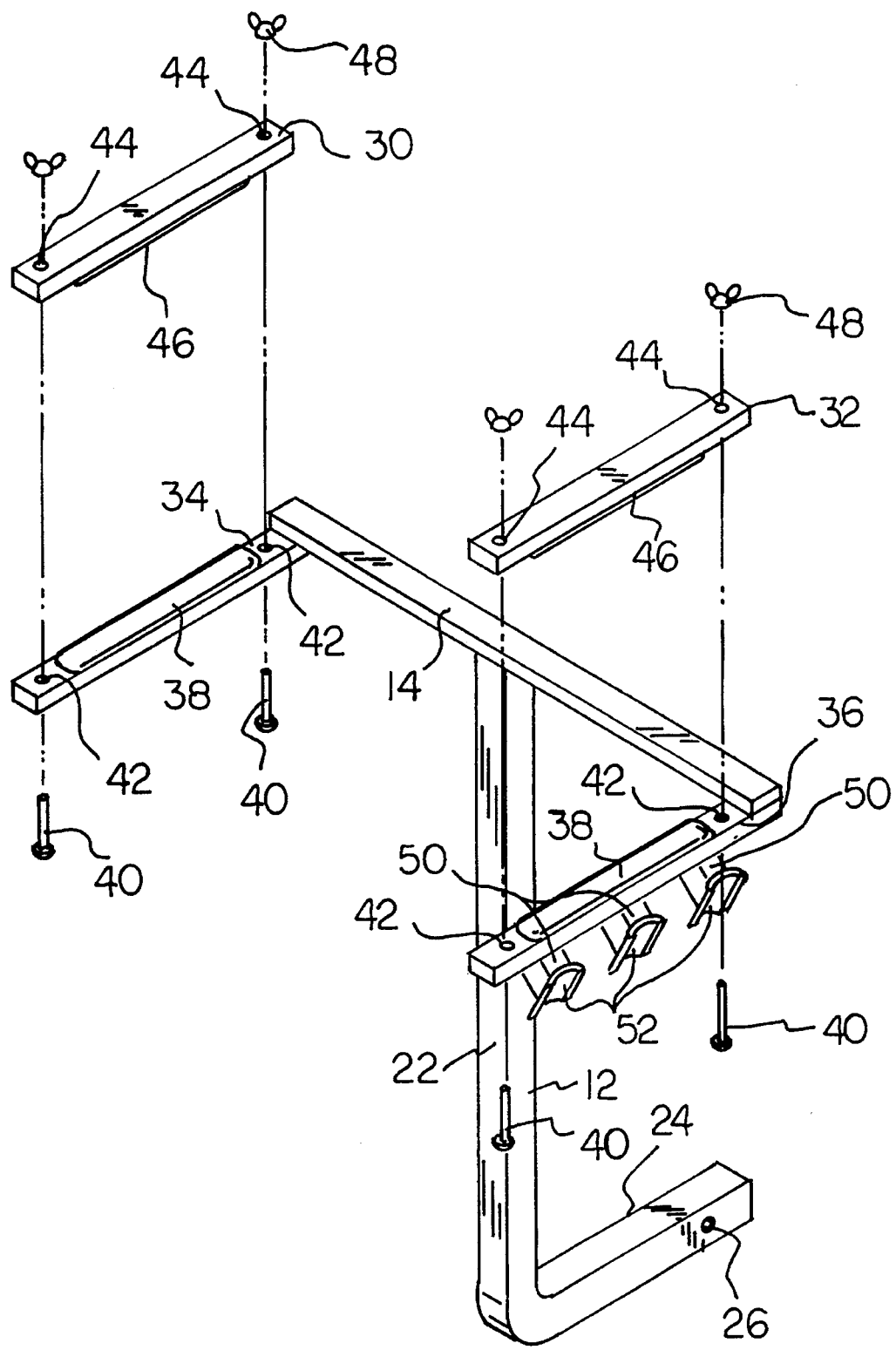
FIG. 7 is a separated perspective view of the apparatus illustrating the positioning of the bolts and wing nuts through the brackets.

More specifically, the main support column 12 is formed as a generally rectangular shaped block and configured into an L-shaped orientation. The column has a long vertically positioned member 22 and a short horizontally positioned member 24. The members are fabricated of sturdy metal materials. In the primary embodiment of the apparatus the two members are formed as one contiguous piece. The intersection of the two members is formed in a rounded configuration. In an alternative embodiment of the apparatus the members are formed as separate units each having an inboard and outboard end. The two members have inboard ends cut at approximately forty five degree angles. The two inboard ends are welded together to form the L-shaped structure. Welding the two members together to form a ninety degree angle provides the apparatus with more strength than a single molded L-shaped member would. Note FIGS. 4 and 7.

Figure 2:
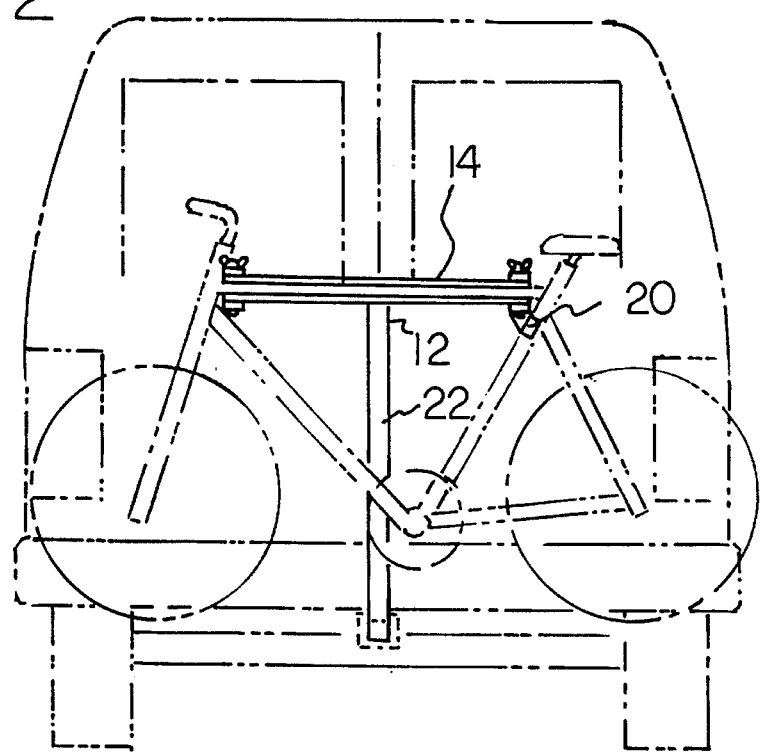
FIG. 2 is a perspective view of the automobile mounted multiple bike and ski rack shown in FIG. 1 illustrating a bicycle mounted in the apparatus.

The long member has a front face, a rear face, and two side faces. The short member extends rearwardly with respect to the long member and includes an upper face, a lower face and two side faces. A lock pin hole 26 extends through the side faces of the short member near its rearwardmost extent. The rearwardmost extent of the short member is adapted to be positioned inside a standard one and one-quarter to two inch tow hitch. The lock pin hole receives a coupling pin to securely couple the column within the hitch in the operative orientation. The free end of the horizontal member is adapted to easily couple inside most standard tow hitches. Note FIGS. 1, 2 and 4.

A cross bar 14 is formed as a generally rectangular shaped block. The cross bar is welded on top of the vertically positioned long member of the main support column at the approximate center point of the bar. The cross bar has an upper face and a lower face and is positioned horizontally in the operative orientation. The cross bar is fabricated of sturdy metal materials. Note FIGS. 3 and 7.

Two side bars 16, 18 each consist of upper 30, 32 and lower 34, 36 mounting brackets. A first 34 and second 36 lower bracket are formed as generally rectangular shaped blocks with an upper face, a lower face, an inboard end and an outboard end. Each lower bracket includes centrally positioned apertures 42 near each end. The inboard end of the lower bracket is welded to the lower surface of the cross bar. The upper and lower brackets are formed of sturdy metal materials. The lower bracket is welded to the side bar to add strength and stability to the apparatus. Note FIGS. 4 and 7.

Figure 6:
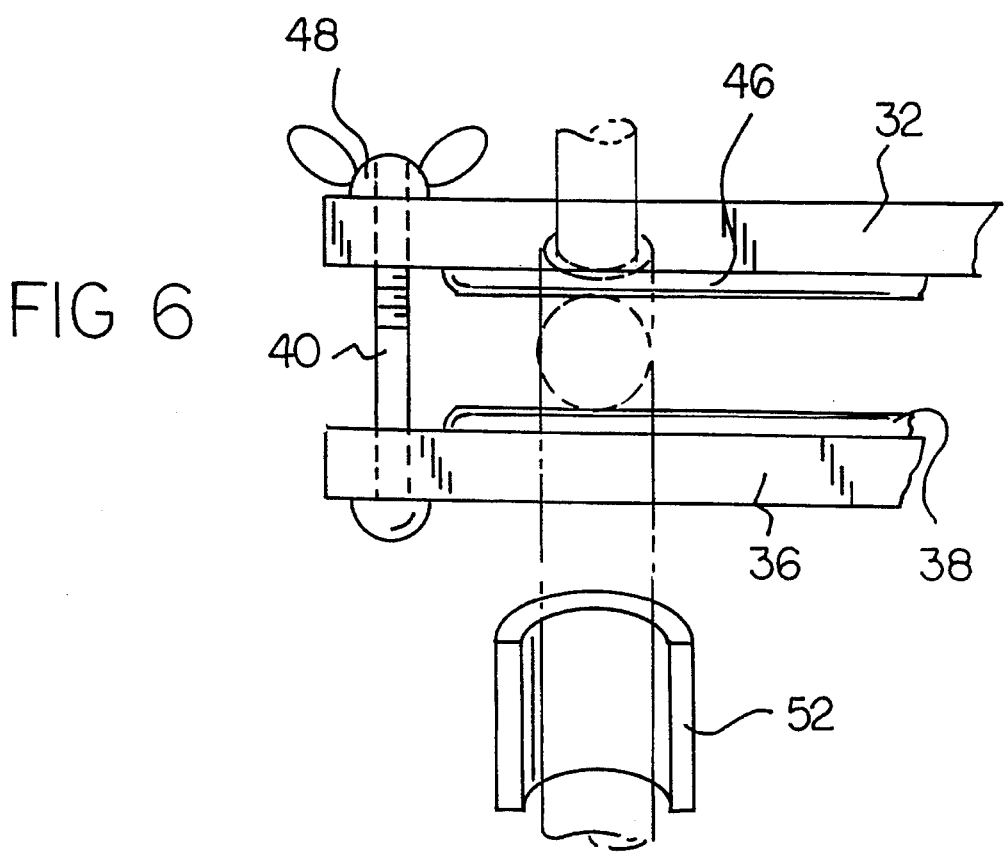
FIG. 6 is an exploded perspective view of the apparatus illustrating the brackets of the apparatus.

The upper face of each lower bracket includes a generally rectangular shaped rubber strip 38 which is positioned between the apertures. Bolts 40 with a plurality of external screw threads are positioned in an inverted orientation through each aperture. The bolt heads are welded to the lower surface of the side bars. Welding the bolt heads to the bracket prevents the possible loss of the bolts. Note FIG. 6.

Figure 5:
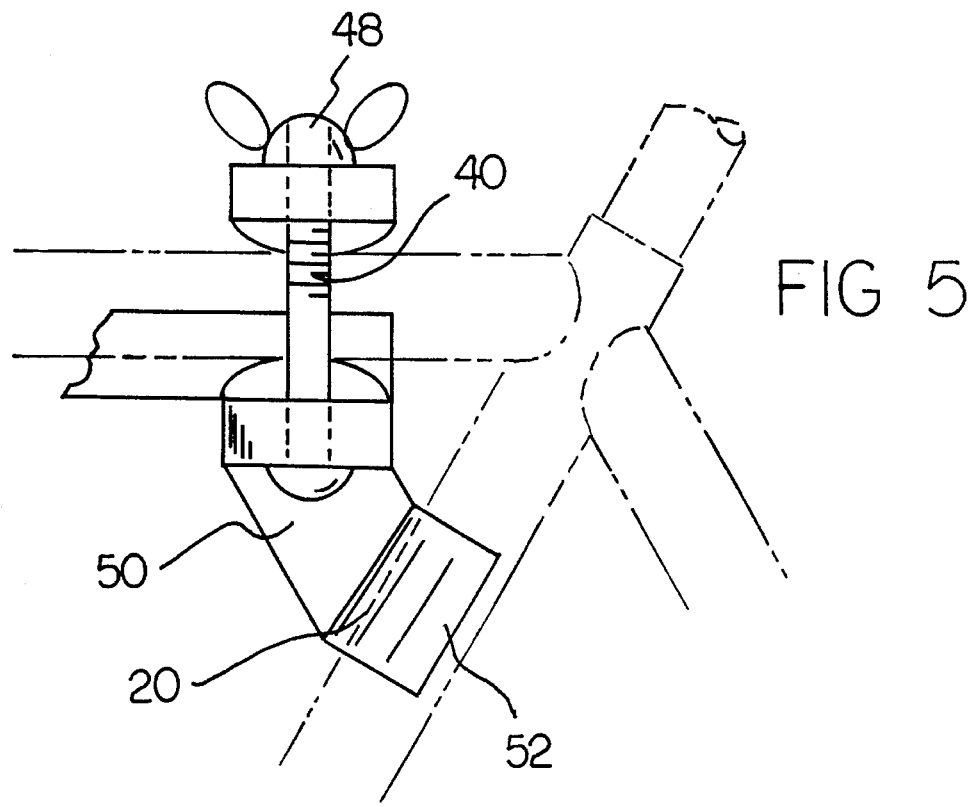
FIG. 5 is an exploded perspective view of the apparatus illustrating a bicycle clamp of the apparatus.

Each upper bracket is formed as a generally rectangular shaped block with an upper face, a lower face, an inboard end and an outboard end. Each upper bracket includes centrally positioned apertures 44 near each end. The lower face of each upper bracket includes a generally rectangular shaped rubber strip 46 positioned between the apertures. The upper brackets are positioned on top of the lower brackets with the bolts positioned through the apertures. Wing nuts 48 cooperatively couple with the bolts to retain the upper brackets in place. The upper and lower brackets are adapted to secure up to three pairs of skis and poles, or up to three bicycles in the operative orientation. The rubber strips prevent scratching of ski equipment or bicycles positioned within the brackets. The wing nuts enable the user to easily tighten or loosen the brackets to accommodate the item secured therein. Up to three sets of skis and poles may be secured within the apparatus simultaneously. Note FIGS. 2, 5 and 6.

Three bicycle clamps 20 are adapted to conformly engage a frame portion of a bicycle and are comprised of an inboard segment 50 and an outboard segment 52. Each inboard segment is formed as a generally rectangular shaped block with two ends. A first end of each inboard segment is welded to the lower surface of the side bar with each being equidistantly spaced between the apertures. The inboard segments are positioned in an angled orientation forming between about a thirty and sixty degree angle with respect to the horizontally positioned side bar. The bicycle frame brackets are positioned in an angled orientation so that they may make firm contact with the inner portion of the frame of bicycles which have been mounted between the upper and lower brackets. Note FIGS. 2 and 5.

Each outboard segment is formed in a generally planar semi circular shaped configuration. Each outboard segment is welded to the second end of each inboard segment. The concave surface of each outboard segment includes foam rubber padding 60 affixed thereto. The padding prevents scratching of the bicycle. The bicycle frame brackets are adapted to aid in the support of bicycles secured within the brackets of the apparatus. The bicycle frame brackets firmly grip the bicycle frame adding stability to the already secure positioning of the bike between the brackets. Up to three bicycles may be mounted simultaneously. Note FIGS. 2, 5 and 7.

The automobile mounted multiple bike and ski rack is designed to secure three bicycles or three pairs of skis and poles at the rear of a vehicle. It is comprised of a support column, a cross bar, two side bars, three bicycle clamps and associated hardware. The support column is made of two sections of two inch square tubing which may be perpendicularly welded together to form the shape of an "L." The shorter horizontally positioned member of the "L" is eighteen inches in length and the vertically positioned member is thirty six inches long.

The cross bar is horizontally positioned on top of the vertical member of the support column. The side bars extend horizontally and perpendicularly from the cross bar. The side bars consist of upper and lower brackets. The brackets are shaped in a rectangular configuration and are faced with rubber strips which are glued to the brackets with contact adhesive. The top bracket is coupled to the lower bracket with bolts and wing nuts which are mounted at either end. The bolts are mounted in an inverted position and the heads are welded to the underside of the lower bracket. Three bicycle frame brackets extend angularly from one of the lower brackets and terminate in one and one-half inch channels which are faced with foam rubber. The frame brackets are used to stabilize the bicycle frame.

In the operative orientation, the automobile mounted multiple bike and ski rack is simply slipped into place within a two inch or one and one-quarter inch standard hitch and is secured therein with a locking cross pin. These standard tow packages are incorporated on most newer sport vehicles. Three bicycles or three sets of skiing equipment are easily secured within the brackets by tightening the wing nuts. The apparatus would be a valuable acquisition for anyone transporting this type of equipment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved automobile mounted multiple bike and ski rack comprising, in combination:

a main support column formed as a generally rectangular shaped block and configured into an L-shaped orientation, the column having a long vertically positioned member formed contiguously with a short horizontally positioned member, the long member having a front face, a rear face, and two side faces, the short member extending rearwardly with respect to the long member and including an upper face, a lower face and two side faces, a lock pin hole extending through the side faces of the short member near its rearwardmost extent, the rearwardmost extent of the short member adapted to be positioned inside a standard one and one-quarter to two inch tow hitch, the lock pin hole receiving a coupling pin to securely couple the column within the hitch in an operative orientation;

a cross bar formed as a generally rectangular shaped block and welded on top of the vertically positioned long member of the main support column at the approximate center point of the bar, the cross bar having an upper face and a lower face and positioned horizontally in the operative orientation;

two side bars each consisting of upper and lower mounting brackets, each said lower mounting bracket being formed as generally rectangular shaped blocks with an upper face, a lower face, an inboard end and an outboard end, each lower mounting bracket including centrally positioned apertures near each end, the inboard end of the lower mounting bracket being welded to the lower face of the cross bar, the upper face of each lower mounting bracket including a generally rectangular shaped rubber strip positioned between the apertures, bolts with a plurality of external screw threads being positioned in an inverted orientation through each said aperture, the bolt heads of said bolts being welded to the lower surface of the respective lower mounting brackets, each upper mounting bracket formed as a generally rectangular shaped block with an upper face, a lower face, an inboard end and an outboard end, each upper mounting bracket including centrally positioned apertures near each end, the lower face of each upper mounting bracket including a generally rectangular shaped rubber strip positioned between the apertures, the upper mounting brackets being respectively positioned on top of the lower mounting brackets with their respective apertures positioned in vertical alignment, the bolts being positioned through the aligned apertures in the mounting brackets, wing nuts being cooperatively coupled with the bolts to retain the upper mounting brackets in place, the mounting brackets sized and adapted to secure up to three pairs of skis and poles or up to three bicycles in the operative orientation; and three bicycle frame brackets being comprised of an inboard segment and an outboard segment, each inboard segment formed as a generally rectangular shaped block with two ends, a first end of each inboard segment being welded to the lower face of one of said lower mounting brackets with each being equidistantly spaced between the apertures of said one lower mounting bracket, the inboard segments being positioned in an angled orientation forming between about a thirty and sixty degree angle with respect to said one lower mounting bracket, each outboard segment being formed in a generally semi-circular shaped configuration having a concave surface for conformly engaging a frame portion of a bicycle, each outboard segment being respectively welded to the second end of each inboard segment, the concave surface of each outboard segment including foam rubber padding affixed thereto, the bicycle frame brackets adapted to aid in the support of the frame portion of bicycles secured within the mounting brackets of the apparatus.

2. An automobile mounted multiple bike and ski rack comprising:

a main support column formed as a generally rectangular shaped block and configured into an L-shaped orientation, the column having a vertically positioned member formed contiguously with a horizontally positioned member, the horizontal member extending rearwardly with respect to the vertically positioned member, the free end of the horizontal member including coupling means to permit releasable coupling inside a standard vehicle tow hitch in an operative orientation;

a cross bar formed as a generally rectangular shaped block and affixed in a horizontal orientation on top of the vertical member of the main support column; and two side bars each consisting of separate upper and lower mounting brackets, the mounting brackets being formed as generally rectangular shaped blocks with each including apertures positioned intermediate first and second ends thereof, one end of each lower mounting bracket being rigidly affixed to the cross bar, each upper mounting bracket being respectively positioned on top of the lower mounting brackets with their respective apertures positioned in vertical alignment bolts with cooperatively coupled wing nuts being positioned through each of the vertically aligned apertures to permit retaining of objects between the mounting brackets, a plurality of bicycle frame brackets formed in a generally semi-circular configuration for conformly engaging a frame portion of a bicycle, the bicycle frame brackets being affixed to at least one of the side bars to aid retainment of bicycles during transport, the upper and lower mounting brackets and bicycle frame brackets including padding to prevent scratching objects secured therein.

3. The apparatus as set forth in claim 2 wherein the bicycle frame brackets are affixed to said at least are side bar at an angle with respect to the side bar.

* * * * *